(No Model.) 2 Sheets—Sheet 1.
I. W. PRICE.
VEHICLE BRAKE.
No. 571,240. Patented Nov. 10, 1896.
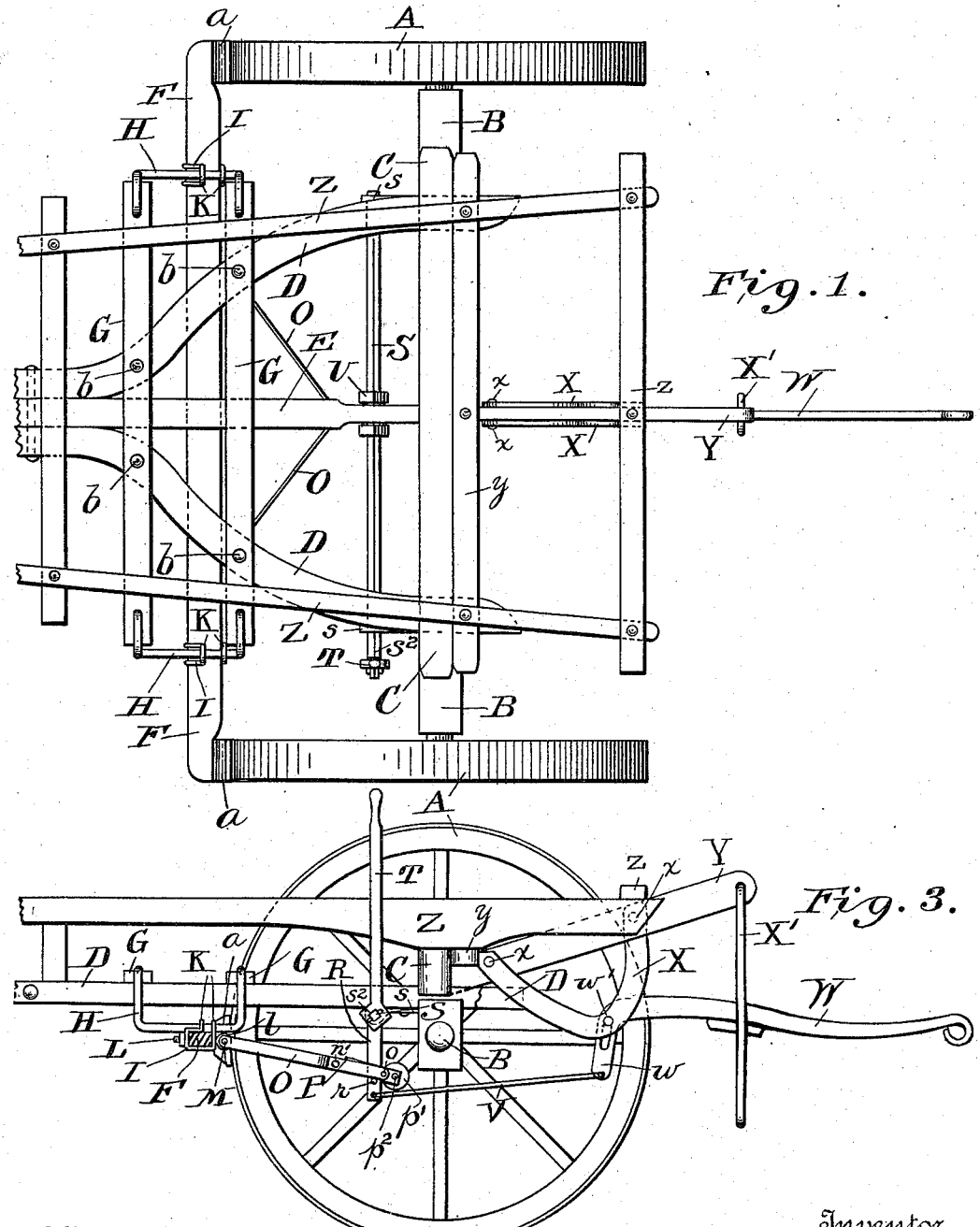
Witnesses
Jas. N. Blackwood
O. B. Lester
Inventor
Isaac Walter Price
by David A. Towrick
Attorney

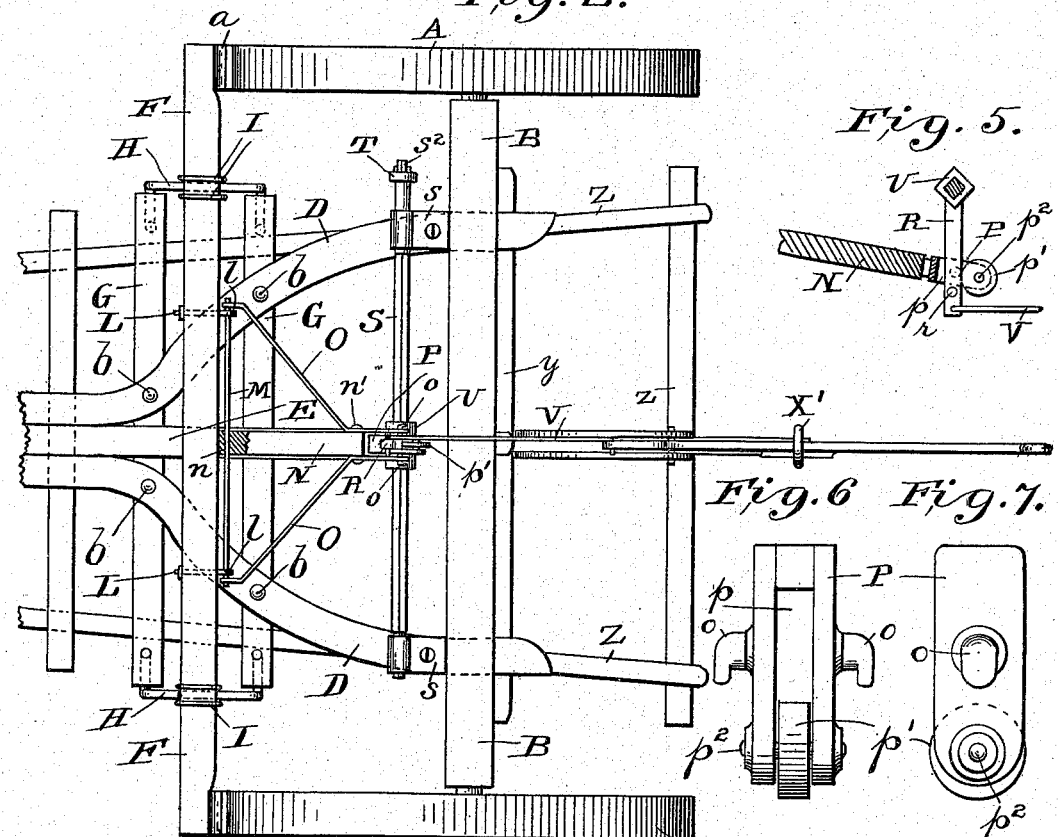

UNITED STATES PATENT OFFICE.

ISAAC WALTER PRICE, OF ROSSEAU, OHIO.

VEHICLE-BRAKE.

SPECIFICATION forming part of Letters Patent No. 571,240, dated November 10, 1896.

Application filed March 17, 1896. Serial No. 583,555. (No model.)

*To all whom it may concern:*

Be it known that I, ISAAC WALTER PRICE, a citizen of the United States, residing at Rosseau, in the county of Morgan and State of Ohio, have invented certain new and useful Improvements in Brakes for Wheeled Vehicles, of which the following is a specification.

My invention relates to brakes for wagons and other wheeled vehicles, and has for its object the providing of simple and easily-operated mechanism for applying brake-shoes to the wheels of such vehicles, quickly and firmly when it is desired to check or stop the wheels revolving and for easily removing the shoes from contact with the wheels when such contact is not desired.

One of the objects of my invention is to provide a brake which may be readily and effectually operated from the top of a load of hay, straw, or grain, and also at the side of a wagon or from the box or body thereof. These objects I accomplish by the means hereinafter more particularly described and claimed, reference being had to the accompanying drawings, in which—

Figure 1 is a top plan view of the rear of a wagon carrying a hay-rack frame and having my improved brake attached. Fig. 2 is a bottom plan view of same. Fig. 3 is a side elevation of same with one of the wheels removed. Fig. 4 is an elevation of rear end. Fig. 5 is a view of the arm R and a longitudinal section of the block P. Figs. 6 and 7 are enlarged views of the block P.

In the said drawings the letters A, B, C, D, and E denote the wheels, axle, bolster, hounds, and reach, respectively, of a wagon of ordinary construction.

F denotes a wooden brake-bar with brake-shoes $a$ $a$ attached to either end thereof in the usual manner.

G G are two wooden bars of the same length placed over the hounds and fastened thereto with iron bolts $b$ $b$, passing through the bars and the hounds D D on either side of the reach. These bars G G are placed parallel to each other and about fourteen inches apart, the rear bar being about on a line with the circumference of the wheels A A, the ends extending a little less than midway between the hounds at the point where the rear bar is bolted and the wheels A A.

Near the ends of the bars G G are fastened rectangular loops H H, which pass outward over the ends of the bars, and turn downward at right angles thereto, the loop having its lower end formed at right angles to its sides. To these loops the brake-bar F is connected by links I I, passing around the bar, their ends turned up so as to form eyes K K. The loops H H pass through these eyes of the links, support the brake-bar in position, and permit it to slide backward or forward in the operation of throwing the brake-shoes in contact with the circumference of the wheel and of releasing it therefrom. Passing through the brake-bar about midway between the reach and the points where it is connected with said loops H H, on either side of the reach, are bolts L L, provided with eyes $l$ $l$, through which passes a rod M.

N is a wooden brace the forward end of which rests normally against the brake-bar, about the middle thereof, the end next the brake being held in position by the rod M, passed through a hole therein, (shown by $n$.) This brace-bar gives strength to the brake-bar when the shoes are set against the wheels and prevent its vibrating and bending backward at the middle. It also helps to push the brake-bar forward when the latter is released from contact with the wheels.

Attached to either side of the brace-bar N at its opposite end are draft-rods O O, fastened to the brace-bar N by an iron bolt $n'$, passing through the draft-rods O O and said brace-bar N. The draft-rods serve not only as rods for drawing the brake-bar back and pushing it forward, but also as stay-rods for holding the brace-bar N in position and for supporting and staying the block, as next described. The ends of the draft-rods O O extend beyond the end of the brace-bar N and support an iron block P, having a longitudinal slot $p$, bearing an antifriction-wheel $p'$, revolving on a pin $p^2$, passing through said block near its open end. This block is pivotally supported between the draft-rods O O, near the ends thereof, by two ears $o$ $o$, one on each of the sides of the block P and rigidly fixed therein or thereto and passing through holes in the draft-rods and having their outer ends flanged to hold the draft-rods in place and permit oscillation of said block.

A flat iron arm R, the construction of which will be hereinafter more fully described, passes through the slot $p$. The draft-rods O O extend outward and forward to the brake-bar, outside of the eyebolts L L, and are provided with holes in their forward ends through which passes the rod M, which may have its ends bent at right angles, or it may have a head on one end and a screw-nut on the other end to keep it from slipping out of the eyebolts and also for holding the draft-rods in place against the eyebolts. Under the hounds, and just forward of the axle B and parallel thereto, is a rock-shaft S, having four sides at its middle part and round at both ends and journaled in the bearings $s\ s$, fastened to the hounds on the under side thereof with bolts. One end $s^2$ of this shaft extends beyond the hound a short distance and is squared and shouldered to hold a lever T to operate the brake from, or at the side of the wagon or vehicle to which it may be attached. The brake may be operated directly with this lever, or the lever may have a connecting-rod attached thereto, the other end of the rod being fastened toward the front of the vehicle to a brake-lever attached to the body of the vehicle in the usual manner. On the rock-shaft S, midway between the points at which it is journaled to the hounds and directly under the reach, is a sleeve U, having the arm R, hereinbefore mentioned as passing through the slot $p$ in the block P. This arm R is formed integral with said sleeve and extending downwardly through said slot $p$, and having holes in it through which a pin $r$ may be passed to hold up the block P in a position below the axle B. The sleeve is held in position on the shaft S by means of a wedge, or it may be provided with set-screws for that purpose. Its middle portion on the upper side is cut away to the shaft, so that it will not press against the reach when the shaft is rotated. When the brake is out of contact with the wheels, the block P will rest on the pin $r$ in the lower end of the arm R, and when said arm is drawn or turned back it causes the block to move upward, and if the movement of the arm continues it will finally reach the end of the arm, where it unites with the sleeve on rock-shaft S. It will be now understood that the arm R is a lever provided with a movable fulcrum which constantly moves toward the fixed end of the lever, when the latter is drawn or rocked backward, thereby drawing with it the brake-bar and intensifying the pressure of the brake against the wheels without increased power being applied in operating the lever.

The lower end of the arm R is provided with a hole into which one end of a connecting-rod V, having hook ends, is inserted when it is desired to use the vehicle without the box or body, as when it is provided with a hay-rack, as partly shown in Figs. 1 and 3. The other end of the rod V is hooked into a hole in the end of an arm $w$ of a brake-lever W, said arm $w$ being turned downward at a right angle to the lever W and suspended by a pin passing through it at the point of curvature $w'$, between two iron brackets bolted at their extremities $x\ x$ to a wooden bar Y, bolted at one end to a bar $y$, resting longitudinally against the rear side of the bolster C and attached to the under side of the pieces forming the side frames of a hay-rack Z Z, the ends of the side pieces of the frame extending back to the rear of the wheels and having bolted to their rear ends a cross-bar of wood $z$, to the middle of which is also bolted on the under side of the bar Y near its rear end and supporting the brackets carrying the lever W.

To the rear end of the bar Y is fastened an iron loop X', extending downward and provided on one of its inner sides with teeth against which the lever W may be set when it is lifted up in drawing the brake in contact with the wheels. The arm $w$ of the brake-lever W may be formed with a slot at the point where it is fulcrumed between the brackets X, whereby it may be moved up in order to increase the lifting or pulling power of the lever W. The end of the lever W is provided with a ring formed by turning the end of the bar to receive a rope for operating the brake from the top of a load on the wagon.

While I have specially designated a hay-rack in describing so much of my improved brake as constructed and operated back of the rear axle, it will be readily understood that such portion of my mechanism may be adapted to any other form of rack or body extending back of the rear axle by fastening the bar $y$ thereto.

The operation of my improved brake as herein shown is as follows: When operated by the rear lever W, lifting the end of the lever draws, by means of the connecting-rod V, the arm R back toward the axle. This motion causes the brake-bar connected with the block P, through which the arm R passes by means of the draft-rods O O and the brace-bar N, to slide back on the supporting-loops H H and bring the brake-shoes in contact with the peripheries of the wheels. The arm R, passing through the block P, is forced into contact with the antifriction-wheel in the block by its lower end being drawn backward and upward and lifts the block and its connecting-rods upward, the antifriction-wheel facilitating the upward movement until the block comes into contact with the sleeve to which the arm is joined. In this position it may now be easily and securely held by engaging the brake-lever with the toothed loop in which it is moved up or down. When the lever W is released from engagement with the toothed portion of the loop X', its weight, together with that of the block and its connections, is sufficient to slide the brake-bar forward on the loop-rods that support it, so that the shoes will be out of reach of the wheels.

When it is desired to use my improved brake upon a carriage or other vehicle for which that portion of the brake which is to the rear of the axle and comprising the rod V, the lever W, and its arm w, brackets X, and bar y is unsuited or unnecesary, said portion may be detached and the brake-bar operated from the side or interior of such vehicle by means of a lever attached directly or by an intermediate rod to the squared end $s^2$ of the rock-shaft S, and the brake-bar operated by rocking the arm R, by means of the sleeve U, rigidly attached to center of said shaft S and the intermediate mechanism, as shown and described.

My improved brake may be used on vehicles having large or small wheels by regulating the distance from the axle, and as it is the practice in some parts of the country to provide wagons with a set of low wheels in addition to the high wheels with which they are ordinarily provided this is a valuable feature of my improved brake. When the brake is to be attached to vehicles having iron hounds or stay-rods or wooden hounds or stay-rods strapped with iron, clasps having ends provided with screw-threads and nuts may be used in lieu of the bolts shown and described herein to fasten the cross-bars by which the brake-bar is supported to the hounds or stay-rods used to connect the hind part to the fore part of the vehicle.

Having thus described my invention, what I claim as new, and desire to secure by Letters Patent, is—

1. In a brake for vehicles, the combination with a brake-bar provided with brake-shoes and draft-rods attached to the vehicle in front of the wheels thereof, of a block having a longitudinal slot bearing an antifriction-wheel revolving on a pin passing through the block near its open end, said block having an ear on either side thereof rigidly fixed thereto for supporting said block pivotally between the ends of the draft-rods connecting with the brake-bar, and an arm attached at one of its ends to the vehicle, its free end passing through the slot in said block, and means for moving said free end backward, whereby the brake-bar is operated, substantially as shown and described.

2. In a brake for wheeled vehicles, the combination with a brake-bar provided with brake-shoes, links passing around said bar, loop-rods passing through the ends thereof and supporting said bar underneath said loops, the loops attached to the ends of bars supported by the hounds of the vehicle and attached thereto, means for drawing the brake-shoes in contact with the circumference of the wheel and applying pressure thereto, substantially as shown and described.

3. In a brake for wheeled vehicles, the combination with a brake-bar having brake-shoes thereon and supported by bars attached to the hounds of the vehicle, rods connecting said brake-bar to a slotted block provided with an antifriction-wheel in the end thereof, the free end of an arm passing downward through said block, its upper end rigidly fixed to a rocking shaft journaled to the hounds and provided with an operating-lever fixed to the outer end thereof, whereby a forward rocking of the shaft causes a backward and upward movement of the free end of the arm fixed thereto and brings the brake-shoes in contact with the circumference of the wheel, substantially as shown and described.

4. In a brake for wheeled vehicles, the combination with a brake-bar provided with brake-shoes and swung by suitable supports attached to the vehicle and in front of the wheels thereof, an arm rigidly fixed at one of its ends to a rock-shaft journaled to the hounds of the vehicle, and provided with means for rocking said shaft, the free end of the arm passing through a block connected with draft-rods to the brake-bar, said block resting normally near the free end of the arm whereby the backward movement of the free end of the arm causes the block to move toward the fixed end thereof and the pressure of the brake-shoes against the wheels is intensified, substantially as shown and described.

5. In a brake for wheeled vehicles, the combination with a brake-bar having brake-shoes thereon and draft-rods attached thereto, the opposite ends of said rods pivoted to a slotted block having an antifriction-wheel pivoted therein, the free end of an arm passing down and through said block, its upper end rigidly connected with a rocking shaft having an operating-lever at the end thereof, whereby the forward rocking of the shaft throws the arm, attached thereto, backward and upward at its lower end, causing the block to which the brake-bar is connected to move upward and draws said brake in contact with the wheels, substantially as shown and described.

6. In a brake for wheeled vehicles, the combination with a brake-bar provided with shoes and supported in front of rear wheels thereof by rods whereon it may slide, said rods connected to bars supported by, and attached to the hounds of the vehicle, a brace-bar hinged at one of its ends to a rod connected to the rear side of the brake-bar, the opposite end of the brace-bar bolted between draft-rods connected to the brake at their forward ends, and at their opposite ends provided with mechanism for drawing the brake in contact with the circumference of the wheels and locking it therewith, substantially as shown and described.

7. In a brake for wheeled vehicles, the combination with a brake-bar provided with brake-shoes and supported in front of the wheels, an operating-lever pivoted to supporting-brackets attached to supports therefor in the rear of the axle, a short arm formed with the operating-lever and turned downward at an angle thereto, a rod connecting said arm to the free end of another arm passing through a slotted block with an antifriction-wheel pivoted therein, the upper end of said arm attached to a shaft, the slotted block pivoted between draft-rods connecting with said brake, substantially as described and shown.

8. In a brake for vehicles, the combination with a brake-bar provided with brake-shoes and supported by rods attached to bars fastened to the vehicle forward of the rear wheels thereof, draft-rods connecting with said brake-bar at points opposite the middle thereof by a rod passing through eyebolts in said brake-bar, and through the ends of the draft-rods, the opposite ends of the latter pivoted on either side of a block and bolted to the sides of a brace-bar back of said block, the opposite end of the brace-bar hinged to the brake-bar at the middle thereof, connecting-rods and levers for operating said brake suitably attached and supported, connecting with the block to which the draft-rods are joined, substantially as shown and described.

9. In a brake for wheeled vehicles, the combination with a brake-bar provided with brake-shoes, hung to rods whereon it may slide in front of the rear wheels of a vehicle, a slotted block having an antifriction-wheel in the end thereof and pivoted between draft-rods attached to the brake-bar at their opposite ends, an arm fixed at one of its ends to a rock-shaft journaled to the hounds near the axle and provided with a lever on one of the ends thereof, the free end of the arm passing through the slotted block forward of the antifriction-wheel therein and having a pin in the end thereof to support said block in a normal position, substantially as shown and described.

10. In a brake for wheeled vehicles, the combination with a brake-bar having brake-shoes thereon and supported on rods on which said brake-bar may slide in front of the wheels of a vehicle, a slotted block with an antifriction-wheel pivoted in the end thereof, draft-rods pivoted to said block and attached to the brake-bar at their opposite ends, an arm fixed at one end to a rock-shaft journaled to the hounds, the free end of the arm passing through the slotted block and provided with a pin to support said block in its normal position, a rod connecting the free end of said arm with the arm of a lever supported in the rear of the axle to the frame of a rack and operating vertically, substantially as shown and described.

11. In a brake for vehicles, the combination with a brake-bar provided with brake-shoes, hung by links passing under and around said bar near either end thereof, loop-rods passing through the ends of the links, the ends of the rods turned up at an angle and connected with the ends of a pair of bars parallel to each other, said bars bolted across and to the hounds of the vehicle, draft-rods attached to said brake-bar, between the point where linked to the supporting-rods thereof, and having the opposite ends connected with the arm of an operating-lever, said lever pivoted between supporting-brackets, whereby the upward lifting of the free end of the lever will draw the brake-shoes in contact with the circumference of the wheels of the vehicle, substantially as shown and described.

In testimony whereof I hereto affix my signature in the presence of two witnesses.

ISAAC WALTER PRICE.

Witnesses:
FRANK HAMBEL,
THOMAS GLASS.